United States Patent
Lee

(10) Patent No.: US 10,286,420 B2
(45) Date of Patent: *May 14, 2019

(54) DOUBLE-SIDED TAPE FOR TOUCH SCREEN PANEL AND MANUFACTURING METHOD THEREOF

(71) Applicant: NDFOS CO., LTD., Chungcheongbuk-do (KR)

(72) Inventor: Chang Hoo Lee, Seoul (KR)

(73) Assignee: NDFOS CO., LTD., Chungcheongbuk-do (KR)

( * ) Notice: Subject to any disclaimer, the term of this patent is extended or adjusted under 35 U.S.C. 154(b) by 209 days.

This patent is subject to a terminal disclaimer.

(21) Appl. No.: 15/127,360

(22) PCT Filed: Feb. 25, 2015

(86) PCT No.: PCT/KR2015/001829
§ 371 (c)(1),
(2) Date: Sep. 19, 2016

(87) PCT Pub. No.: WO2015/141955
PCT Pub. Date: Sep. 24, 2015

(65) Prior Publication Data
US 2017/0152409 A1    Jun. 1, 2017

(30) Foreign Application Priority Data

| Mar. 18, 2014 | (KR) | 10-2014-0031801 |
| Mar. 26, 2014 | (KR) | 10-2014-0034988 |
| Jun. 9, 2014 | (KR) | 10-2014-0069564 |
| Oct. 24, 2014 | (KR) | 10-2014-0145172 |

(51) Int. Cl.
*B05D 3/02* (2006.01)
*C08K 7/22* (2006.01)
(Continued)

(52) U.S. Cl.
CPC ......... *B05D 3/0254* (2013.01); *B05D 3/0406* (2013.01); *C09J 7/29* (2018.01); *H01M 2/08* (2013.01); *C08K 7/22* (2013.01); *C08K 9/00* (2013.01); *C09J 2201/128* (2013.01); *C09J 2201/606* (2013.01); *C09J 2203/33* (2013.01); *C09J 2205/10* (2013.01);
(Continued)

(58) Field of Classification Search
None
See application file for complete search history.

(56) References Cited

U.S. PATENT DOCUMENTS

| 2005/0221073 A1* | 10/2005 | Liou | A41D 19/0065 |
| | | | 428/304.4 |
| 2014/0255679 A1* | 9/2014 | Goeb | C09J 7/00 |
| | | | 428/305.5 |
| 2017/0121481 A1* | 5/2017 | Hatanaka | C08J 9/122 |

FOREIGN PATENT DOCUMENTS

| JP | 2005-187531 A | 7/2005 |
| JP | 2005-281360 A | 10/2005 |
(Continued)

Primary Examiner — Xiao S Zhao
(74) Attorney, Agent, or Firm — Novick, Kim & Lee, PLLC; Jae Youn Kim

(57) ABSTRACT

The present invention provides a double-sided tape for a touch screen panel which comprises a shock resistant filler layer to exhibit excellent viscosity while being thin and have excellent shock resistance and an excellent waterproof property, and a manufacturing method.

8 Claims, 6 Drawing Sheets

(51) Int. Cl.
*B05D 3/04* (2006.01)
*H01M 2/08* (2006.01)
*C09J 7/29* (2018.01)
*C08K 9/00* (2006.01)

(52) U.S. Cl.
CPC ...... *C09J 2205/106* (2013.01); *C09J 2205/11* (2013.01); *C09J 2433/00* (2013.01); *C09J 2433/001* (2013.01); *C09J 2433/006* (2013.01); *C09J 2467/006* (2013.01); *H01M 2220/20* (2013.01)

(56) References Cited

FOREIGN PATENT DOCUMENTS

| | | | |
|---|---|---|---|
| JP | 2013-244592 | A | 12/2013 |
| KR | 10-0177491 | B1 | 5/1999 |
| KR | 10-2003-0023416 | A | 3/2003 |
| KR | 10-2008-0072664 | A | 8/2008 |
| KR | 10-2013-0092112 | A | 8/2013 |

* cited by examiner

DOUBLE-SIDED TAPE FOR TOUCH SCREEN PANEL AND MANUFACTURING METHOD THEREOF

BACKGROUND OF THE INVENTION

Field of the Invention

The present invention relates to a double-sided tape for a touch screen panel and a manufacturing method, and more particularly to a double-sided tape for a touch screen panel which is located between a panel module and a liquid crystal module of a touch screen, exhibits excellent viscosity while being thin and has excellent shock resistance and an excellent waterproof property, and a manufacturing method.

Description of the Related Art

In portable electronic devices such as an electronic note, a cellular phone, PHS, a camera, a music player and the like, double-sided tapes are being used to fix various members and modules, including an attachment of a protection panel of an information display part and a case. The double-sided tapes have required a lot of useful functions in order to gain competitive advantage in the market, and one of the functions requires giving a waterproof property.

Japanese Laid-Open Patent Publication No. 2005-187531 provides a double-sided tape used to fix parts of an electronic device. For example, there is disclosed a double-sided adhesive sheet which has a maximum value of a loss tangent (tanδ) at a temperature region of −40to −15° C., and has an adhesive layer having side adhesive strength to a specific adhered object of 19N/cm² or more arranged on double sides of a supporter. The double-sided adhesive sheet comprises a specific adhesive layer to provide excellent adhesion and to exhibit excellent shock resistance which makes it difficult to detach parts due to shock in falling of objects.

However, in attaching rigid bodies as in the attachment of the protection panel and the case, since double-sided adhesive sheet finds difficulty in obtaining complete adhesion between the adhered object and an attachment surface, the parts flooded when there were a few gaps.

Japanese Laid-Open Patent Publication No. 2005-281360 provides a double-sided adhesive tape with excellent adhesion. There is disclosed a double-sided adhesive tape which refers to a foaming body as a base, and has an acrylic-based adhesive layer having a maintenance time of 24 hours or more in a maintenance test at a temperature of −25° C. or less and 0° C., wherein the temperature indicates a maximum value of a loss tangent (tanδ). The double-sided adhesive tape has excellent adhesion to an adhered object, from which members can be very properly connected in the attachment between the members.

However, although the foaming body is used as the base, it is difficult to restrain even a few gaps from occurring on an interface between the member and the adhesive layer. Hence, when a gap or a crack through which water can permeate is present on part of the interface, a permeation path is enlarged therefrom. As a result, it is difficult to implement an excellent waterproof property.

Specifically, portable electronic devices are required to become narrow and thinner according to recent large screens thereof, and as a result, when a narrow tape or a thin tape is required, it is difficult to give a sufficient waterproof property to the tape.

SUMMARY OF THE INVENTION

Technical Problem

The present invention was made to solve the aforementioned problem occurring in the prior art, and it is an object of the present invention to provide a double-sided tape for a touch screen panel which is located between a panel module and a liquid crystal module of a touch screen, exhibits excellent viscosity while being thin and has excellent shock resistance and an excellent waterproof property, and a manufacturing method.

Technical Solution

The present invention provides a double-sided tape for an a touch screen panel comprising a base film; a shock resistant filler layer formed on the base film and comprising an acrylic binder and an shock resistant filler containing 5-60 parts by weight with respect to 100 parts by weight of the acrylic binder; first and second adhesive layers formed an upper side of the shock resistant filler layer and a lower side of the base film, respectively; and a release layer formed on a lower side of the second adhesive layer, wherein the shock resistant filler of the shock resistant filler layer comprises a plurality of hollow fine particles.

In accordance with another preferable embodiment, the hollow fine particles may comprise 50-80 parts by weight of calcium carbonate, with respect to a total of 100 parts by weight, and may further comprise a second coating film disposed arranged along the circumference of the first coating film.

In accordance with another preferable embodiment, the shock resistant filler layer may comprise 5-60 parts by weight of the shock resistant filler, with respect to 100 parts by weight of the acrylic binder.

In accordance with another preferable embodiment, a monomer of the first coating film may be a copolymer comprising at least one of 15-40 parts by weight of acrylonitrile, with respect to 100 parts by weight of the hollow fine particles, phosphate methacrylate and alkali strippable polyester acrylate.

In accordance with another preferable embodiment, at least one of the base film and the shock resistant filler layer may turn black, and the black coloring agent comprise at least one of carbon black and iron sulfide.

In accordance with another preferable embodiment, the hollow fine particles comprise: liquid hydrocarbon comprising 1-10 parts by weight of 2-methyl butane and 1-10 parts by weight of 2-methyl propane, with respect to a total of 100 parts by weight; a first coating film formed of a thermoplastic material comprising a copolymer containing at least one of 15-40 parts by weight of acrylonitrile, phosphate methacrylate, alkali strippable polyester acrylate, and formed to surround the liquid hydrocarbon; and a second coating film formed of 50-80 parts by weight of calcium carbonate, and formed to surround the first coating film.

An embodiment of the present invention provides a method for manufacturing a double-sided tape for a touch screen panel, comprising the steps of: coloring a base film black; forming a shock resistant filler layer by coating a paste containing a shock resistant filler having an acrylic binder and a plurality of hollow fine particles on an upper side of the base film; forming first and second adhesive layers on an upper side of the shock resistant filler layer and a lower side of the base film, respectively; and forming a release layer on a lower side of the second adhesive layer, wherein the hollow fine particles are manufactured by the steps of: preparing a hydrogen dispersion by inputting 2-6 parts by weight of liquid hydrocarbon with respect to a total of 100 parts by weight and a dispersing agent into water; preparing a particulate crystal by inputting 15-40 parts by weight of a monomer into the hydrogen dispersion, with respect to a total of 100 parts by weight of the hollow fine particles, and forming a first coating film on the circumference of the hydrocarbon; forming an unexpanded microsphere by heating the particulate crystal and removing the hydrocarbon; and preparing an expanded microsphere by heating the unexpanded microsphere to expand the first coating film.

In accordance with another preferable embodiment, the hollow fine particles may be manufactured by further comprising the step of arranging a second coating film containing 50-80 parts by weight of calcium carbonate, with respect to a total of 100 parts by weight of the hollow fine particles, on the circumference of the first coating film of the expanded microsphere.

In accordance with another preferable embodiment, in the step of preparing the hydrogen dispersion, the liquid hydrocarbon may comprise 1-10 parts by weight of 2-methylbutane and 1-10 parts by weight of 2-methylpropane, with respect to a total of 100 parts by weight of the hollow fine particles.

In accordance with another preferable embodiment, in the step of preparing the hydrogen dispersion, the dispersing agent may be a surfactant.

In accordance with another preferable embodiment, in the step of preparing the particulate crystal, the monomer may be a copolymer of 15-40 parts by weight of acrylonitrile with respect to a total of 100 parts by weight of the hollow fine particles, and other acrylic groups.

In accordance with another preferable embodiment, in the step of preparing the expanded microsphere, the unexpanded microsphere may be heated at a temperature of 170-190° C.

In accordance with another preferable embodiment, the step of forming the second coating film may comprise the steps of: inputting the expanded microsphere and the calcium carbonate into a reactor, and inserting air thereto at a temperature of 130-150° C., thereby floating the expanded microsphere and the calcium carbonate inside the reactor; and forming a second coating film while embedding the calcium carbonate in an outer wall of the first coating film of the expanded microsphere.

In accordance with another preferable embodiment, in the step of coloring the base film black, at least one of carbon black and iron sulfide may be used as the black coloring agent.

In accordance with another preferable embodiment, in the step of forming the shock resistant filler layer, the shock resistant filler may comprise 5-60 parts by weight with respect to 100parts by weight of the acrylic binder.

Effects of the Invention

The double-sided tape for a touch screen panel according to the exemplary embodiment of the present invention exhibits excellent adhesion to an adhered object while being thin and has excellent shock resistance and an excellent waterproof property to effectively prevent penetration of water from a tight gap. Thus, when the double-sided tape is used in a touch screen panel of a portable electronic device which has difficulty in preparing a separate water sealing means because the portable electronic device becomes thin to have strict bulk restriction in a case thereof, it is able to effectively give a waterproofing function to the portable electronic device.

DETAILED DESCRIPTION OF THE EMBODIMENTS

Hereinafter, exemplary embodiments in the present disclosure will be described in detail with reference to the accompanying drawings. The disclosure may, however, be exemplified in many different forms and should not be construed as being limited to the specific embodiments set forth herein.

Unless explicitly stated to the contrary, the word "comprise," "comprises" or "comprising" used throughout the specification will not be understood as the exclusion of the other elements but to imply the inclusion of the other elements.

Figure 1:
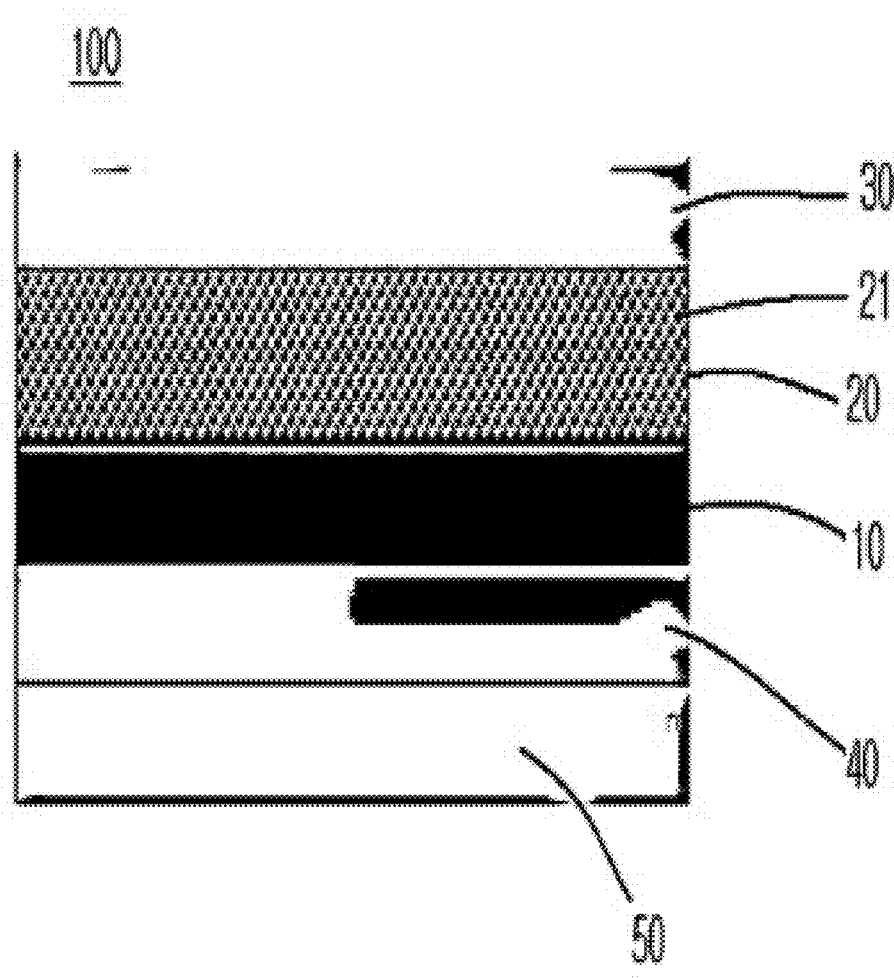
FIG. 1 is a side sectional view of a double-sided tape for a touch screen panel according to an exemplary embodiment of the present invention.

FIG. 1 is a side sectional view of a double-sided tape for a touch screen panel according to an exemplary embodiment of the present invention.

With reference to FIG. 1, the double-sided tape 100 for the touch screen panel according to the exemplary embodiment, comprises a base film 10; a shock resistant filler layer 20; first and second adhesive layers 30, 40; and a release layer 50. Herein the double-sided tape 100 for the touch screen panel may formed at a total thickness of 100-300 μm. However, the present invention is not limited thereto.

The base film 10 which is a layer to be a base of the double-sided tape 100 may be preferably formed of polyethylene terephthalate (hereinafter referred to as "PET"), but the present invention is not limited thereto. For example, the base film 10 may be manufactured by applying graphite with excellent heat resistance and heat conductivity or a conductive material for the addition of radiating and conductive functions.

Further, for example, a urethane base and the like may be applied to a primer applied to the base film 10, but the present invention is not limited thereto. The PET has an advantage of securing workability of easily removing the double-sided tape when the defects were generated due to wrong assembling at the adhesive layer, and reassembling as needed.

Further, the thickness of the base film 10 may be, for example, 20-40 μm. For example, when a total thickness of the double-sided tape 100 is 250 μm or less, the thickness of the base film 10 may be about 23 μm, and when the total thickness of the double-sided tape 100 is greater than 250 μm, and, for example, the total thickness is about 300 μm, the thickness of the base film 10 may be about 38 μm.

Herein, when the thickness of the base film 100 is less than 20 μm, the problem of lowering heat resistance of the double-sided tape 10 and shortening a material may occur, and when the thickness of the base film 10 is greater than 40 μm, because the shock resistant filler layer 20, the first and second adhesive layers 30, 40 and the like should be relatively thinly formed, the shock resistance and the adhesion of the double-sided tape 100 may be decreased, which is problematic. The base film 10 having the thickness can apply all to a touch screen window panel and the like, formed of acryl or a glass raw material. However, the thickness of the base film of the double-sided tape of the present invention is not necessarily limited to the numerical values described above.

Further, a surface of the base film 10 may turn black. When the surface of the base film 10 turns black, the function of shading the light is given to the base film 10, and the base film 10 can serve as preventing the light transferred to a backlight unit from escaping to a frame part of a display. Furthermore, the adhesive forces to the first and second adhesive layers 30, 40 respectively disposed on upper and lower sides of the base film 10 can be further improved.

Herein, the black coloring agent may comprise at least one of carbon black capable of exhibiting black and iron sulfide. Further, the carbon black may use a urethane-based resin as a binder. The urethane-based resin has a stable physical property, and an excellent adhesive force to an acrylic-based adhesive layer. In the exemplary embodiment, the black coloring agent may be manufactured by mixing part of various materials according to the color and the physical property as needed. However, the black coloring agent of the present invention is not limited to the specific ingredient or the content described above.

The shock resistant filler layer 20 is formed on the upper side of the base film 10. Further, the thickness of the shock resistant filler layer 20 varies according to the total thickness of the double-sided tape 100, and may be, for example, 60-80 μm.

Further, a surface of the shock resistant filler layer 20 may turn black as needed. When the surface of the shock resistant filler layer 20 turns black, the function of shading the light is given to the shock resistant filler layer 20, and thus, the degradation of the reliability for partial defects due to the function of shading the light can be prevented. Herein, the black coloring agent may comprise at least one of carbon black and iron sulfide.

In a prior-art double-sided tape having a PE-foam structure, a PE-foam may be transferred to a base film or an adhesive layer in contact vertically in reworking. However, since the exemplary embodiment contains the shock resistant filler layer 20 and does not use the PE-foam, it does not cause such a problem.

Such a shock resistant filler layer 20 may be formed by coating a paste containing an acrylic binder and the shock resistant filler on the upper side of the base film 100.

The acrylic binder may be formed of, for example, acrylonitrile. However, the present invention is not limited thereto. Meanwhile, the shock resistant filler layer 20 may further comprise additives such as a cross linker, a tackifier and the like, as needed. The additives may be added at a content of 0.1-30 parts by weight, with respect to 100 parts by weight of the acrylic binder. However, the present invention is not limited thereto.

Further, shock resistance and density of the shock resistant filler layer 20 may vary according to the content of the shock resistant filler contained in the acrylic binder. For example, the shock resistant filler may comprise 5-60 parts by weight with respect to 100 parts by weight of the acrylic binder.

Since the shock resistant filler is an impurity, when it exceeds 60 parts by weight with respect to 100 parts by weight of the acrylic binder, it has a low combination with the acrylic binder. Hence, as the paste is split and coating is not available, the original function of the shock resistant filler cannot be carried out. Further, when the content of the shock resistant filler is less than 5 parts by weight with respect to 100 parts by weight of the acrylic binder, the problem of lowering the shock resistance and repellent resistance may occur.

Further, the shock resistant filler comprises a plurality of hollow fine particles 21 with low density. Herein, the hollow fine particles 21 have proper cushiness and can provide shock resistance.

The hollow fine particles 21 are particles having hollow parts formed therein, and may be manufactured in various forms in a various methods. Exemplary embodiments will be described below.

Further, the hollow fine particles 21 may comprise liquid hydrocarbon and a first coating film disposed on an outer surface thereof by referring to the liquid hydrocarbon as a nucleating agent. After the liquid hydrocarbon serves as forming the first coating film, it is removed in a polymerizing process described below.

The liquid hydrocarbon may comprise, for example, 1-10 parts by weight of 2-methyl butane, and 1-10 parts by weight of 2-methyl propane, with respect to a total of 100 parts by weight of the hollow fine particles 21.

Herein, in the liquid hydrocarbon, when the content of the 2-methyl butane is less than 1 part by weight, inner expansion is insufficient in manufacture of the hollow fine particles 21, and thus the problem of lowering the shock resistance of the hollow fine particles 21 may occur. Further, when the content of the 2-methyl butane is greater than 10 parts by weight, there is overexpansion in manufacture of the hollow fine particles 21, and thus the hollow fine particles 21 do not keep a constant type to lower uniformity, thereby decreasing an overall physical property.

Further, when the content of the 2-methyl propane is less than 1 part by weight, inner expansion is insufficient in manufacture of the hollow fine particles 21, and thus the problem of lowering the shock resistance of the hollow fine particles 21 may occur. Further, when the content of the 2-methyl butane is greater than 10 parts by weight, there is overexpansion in manufacture of the hollow fine particles 21, and thus the hollow fine particles 21 do not keep a constant type to lower uniformity, thereby decreasing an overall physical property.

The first coating film may comprise a thermoplastic material containing a monomer. The thermoplastic material may comprise 15-40 parts by weight with respect to a total of 100 parts by weight of the hollow fine particles 21. The thermoplastic material may comprise, for example, a copolymer of acrylonitrile and other acrylic groups, but the thermoplastic material of the present invention is not limited thereto. The other acrylic groups may comprise phosphate methacrylate, alkali strippable polyester acrylate and the like.

Herein, when the content of the thermoplastic material is less than 15 parts by weight, because it has an impact on crosslink density, a coating treatment may not be smoothly performed. Further, when the content of the thermoplastic material is greater than 40 parts by weight, because it has an impact on the content of the shock resistant filler, the shock resistance and the reliability may be lowered.

The first coating film supplies elastic and restoring forces to the double-sided tape 100, and supplies the shock resistance thereto to serve as supply of a tolerance to mechanical distortion. For example, even if a load of about 0.7 Mpa is repetitively applied to the double-sided tape 100, the double-sided tape 100 is not damaged with the elastic and restoring forces of the first coating film.

Meanwhile, the hollow fine particles 21 may further comprise a second coating film arranged along the circumference of the first coating film, as needed. The second coating film may comprise 50-80 parts by weight of calcium carbonate with respect to 100 parts by weight of the hollow fine particles 21. The second coating film improves a shattering property of the liquid hydrocarbon, and improves dispersibility in a resin of the first coating film, thereby having an effect of further improving the shock resistance of the hollow fine particles 21.

Further, the second coating can increase a gravity of the hollow fine particles 21 while preventing the hollow fine particles 21 from being condensed in the shock resistant filler, and can serve as improving a mixing property.

Herein, when the content of the calcium carbonate is less than 50 parts by weight, workability may be decreased because of shattering the shock resistant filler, and when the content of the calcium carbonate is greater than 80 parts by weight, the shock resistance may be lowered.

Meanwhile, the diameter of the hollow fine particles 21 of the exemplary embodiment may be 10-50 μm, wherein an inner through-hole which the liquid hydrocarbon occupies in the step of manufacturing the hollow fine particles 21 accounts for 95%, and the thicknesses of the first and second coating films may be 1 μm or less in totality. The diameter of the hollow fine particles 21 keeps the uniformity of a product in the foregoing scope to minutely adjust the level of illumination, thereby ensuring a step compensation of the product and stability of the adhesive power. However, the present invention is not limited thereto.

Meanwhile, since the shock resistant filler layer 20 uses the hollow fine particles 21 having the uniform diameter described above, it has an excellent level of illumination in general. In addition, since it is soft like a sponge, it properly fills even the nonuniform level of illumination of an injection product, thereby securing the adhesive power and the reliability. For example, when it is used in an interface between a panel module and a liquid crystal module of the touch screen, it easily permeates into a gap between the panel module and the liquid crystal module, thereby greatly increasing adhesion.

The first and second adhesive fillers 30, 40 are formed on an upper side of the shock resistant filler layer 20, and a lower side of the base film 10, respectively. The first and second adhesive fillers 30, 40 may be formed of, preferably, an acrylic-based pressure sensitive adhesive agent, but the present invention is not limited thereto. Further, the first and second adhesive fillers 30, 40 can adjust the contents of e-EHA, CHMA and nBA, so as to embody excellent water resistance, adhesive power and reliability in polymerization of the acrylic-based adhesive agent.

Herein, the first and second adhesive layers 30, 40 may have different adhesive powers according to adhered objects. Hence, the first adhesive layer 30 may be formed to have a different thickness, and, for example, it may be formed to be thicker by about 10 μm than the second adhesive layer 40 formed between the base film 10 and a release layer 50.

Further, as the first adhesive layer 30 or the second adhesive layer 40 gets thicker by a critical thickness, the adhesive power thereof is increased. Thus, the adhesive layer is made as thick as possible, from which the adhesive power can be improved, and also, the adhesive layer itself can provide a constant cushioning property. When the first adhesive layer 30 or the second adhesive layer 40 is too thin, the adhesion is lowered, and when the first adhesive layer 30 or the second adhesive layer 40 is too thick, it may have an impact on blanking molding in a blanking process.

Further, the first and second adhesive layers 30, 40 controls their softness by adjusting crosslink density, thereby further improving the shock resistance and providing a step compensation effect according to a stacking structure. Herein, the crosslink density can be adjusted by controlling the kinds and the contents of hardening agents.

The release layer 50 may be formed on a lower side of the second adhesive layer 40. The release layer 50 serves as preventing the finished tape 100 from having foreign substance or being damaged when the double-sided tape 100 is stored or transported. The release layer 50 can uses, for example, a product in which a PE film is connected to paper and silicon is release-treated on an outer surface of the PE film. However, the present invention is not limited thereto. For example, the release product 50 may use the product in which silicon is release-treated in glassine and PET goods. Acryl and silicon are incompatible and are not thus coupled to each other, and as a result, an acrylic adhesive agent may use a product in which the release film is silicon-treated.

In an exemplary embodiment of the present invention, the thickness of the paper may be 70-80 μm, and the PE film of which the thickness is 30-40 μm may be used on its double sides. Further, for the release-treatment of the silicon, the silicon may be coated with a thin film having a thickness of 1 μm or less. Herein, according to the kind of the used silicon, release powers and transition rates of the release layer 50 may be different, and, typically, the release layer 50 uses the transition rate of 90% or more. Herein, the transition rate indicates a numerical value of moving silicon to acryl, wherein the low transition rate indicates the small change in a physical property.

Herein, from the comparison between the comparative examples and the embodiments of the present invention, the excellent characteristics of the double-sided tape according to the present invention will be described below.

Comparative Example 1 shows a double-sided tape having an acrylic-foam structure having a total thickness of 200 μm, Comparative Examples 1 to 4 show double-sided tapes having polyethylene-foam structures of which total thicknesses are 250 μm, 200 μm and 200 μm, respectively, and Embodiments 1 to 3 show double-sided tapes having shock resistant filler layers of which total thicknesses are 200 μm, 250 μm and 300 μm, respectively.

Herein, in Embodiment 1, the thicknesses of the first and second adhesive layers were 60 μm, and the thickness of the shock resistant filler layer was 60 μm. In Embodiment 2, the thicknesses of the first and second adhesive layers were 70 μm, and the thickness of the shock resistant filler layer was 70 μm. In Embodiment 3, the thicknesses of the first and second adhesive layers were 90μm, and the thickness of the shock resistant filler was 80 μm. In Embodiments 1 to 3, the contents of the shock resistant fillers in all the shock resistant filler layers used 35 parts by weight with respect to 100 parts by weight of the acrylic binder.

Hereinafter, Embodiments 1 to 3 will be referred to as "the embodiments" and described as needed when describing features irrelevant to the total thickness.

An adhesive power test is called an ASTM D 3330 test, wherein the double-sided tapes of the comparative examples and the embodiments adhered to an SUS board, a PC board and glass, respectively, by reciprocating 2 kg of a rubber compressing roller one time at a velocity of 300 mm/min, and then, they were left for 30 minutes at room temperature. The forces (gf/25 mm) of detaching the double-sided tapes from adhered objects were measured.

Figure 2:
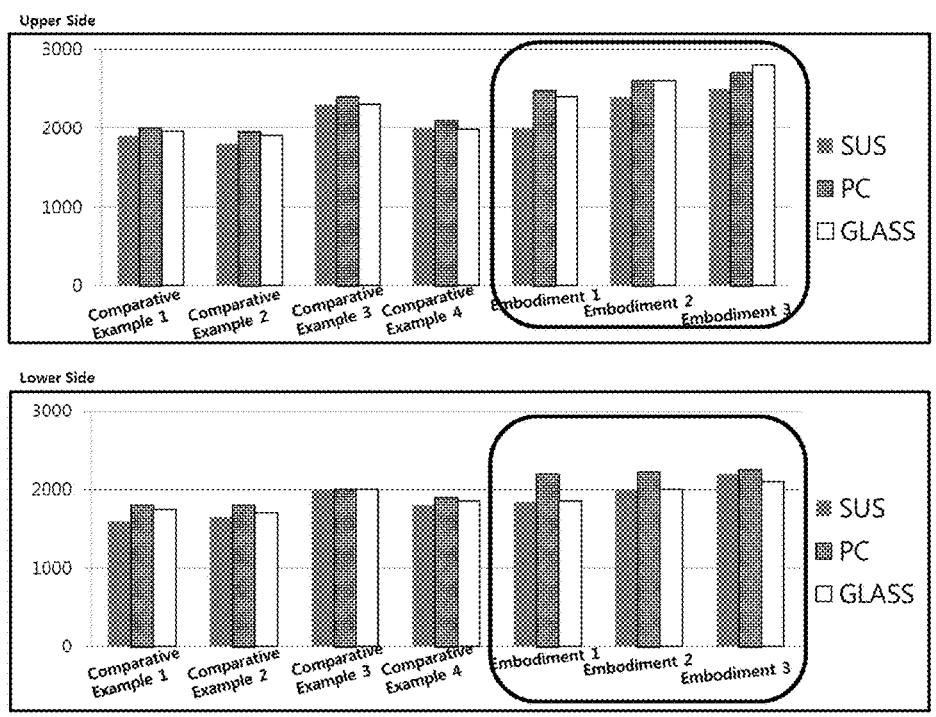
FIG. 2 is a graph showing the result of comparing adhesion tests between embodiments of the present invention and comparative examples.

With reference to FIG. 2, as a result of the measurement, it can be confirmed that both upper and lower sides in Embodiments 1 to 3 are similar to or have relatively higher force values than those of Comparative Examples 1 to 4. Thus, it can be known that the double-sided tapes having the shock resistant filler layers of the embodiment of the present invention are similar to or have more excellent adhesion than the double-sided tapes having the acrylic foam or the PE-foam (Comparative Examples 1 to 4).

As a result, the comparative examples should additionally use an adhesive so as to reduce a difference of such adhesion. The use of the adhesive makes it impossible to carry out rework of separating the double-sided tape from the adhered object and reassembling it as needed, and also leads to several problems such as rise in costs, a complicated manufacturing process and the like.

Figure 3:
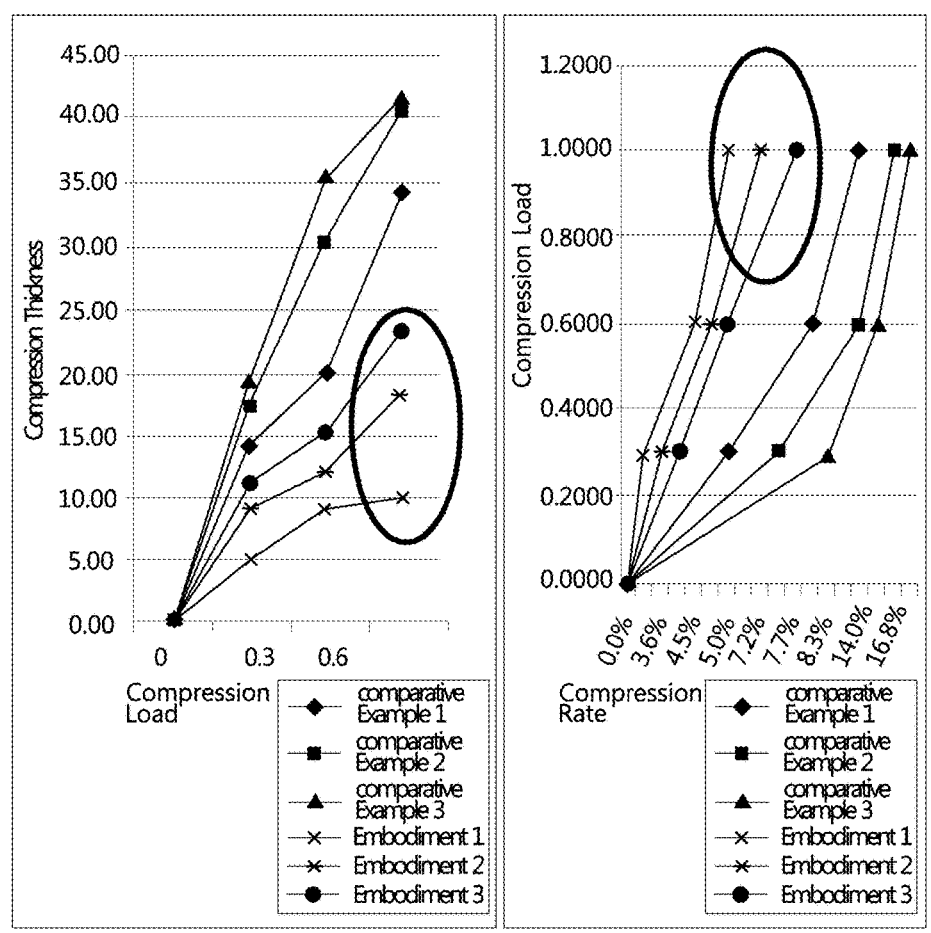
FIG. 3 is a graph showing the result of comparing shock resistance tests between embodiments of the present invention and comparative examples.

The test of the shock resistance is for measuring a restoring force according to pressure applied to the product. With reference to FIG. 3, as a result of the measurement, the embodiments have a smaller change in the thickness as per the pressure applied to the product than the comparative examples, and have a smaller compression rate as per the pressure applied to the product than the comparative examples. Herein, the unit of a compression thickness is μm, the unit of a compression str. is mPa, and the unit of a compression rate is %. In the test of the shock resistance, conventional products using the PE-foam are used only in Comparative Examples 2 and 3.

In general, when the double-sided tape applies to the touch screen panel, there may be cracks or peeling on the upper and lower plates due to artificial impacts. The test result shows that in the comparative examples, when the characteristic of low elasticity and low density and the pressure are applied to the tapes, they have slow restoring forces. In contrast, in the embodiments, the shock resistant filler formed of the hollow fine particle of the shock resistant filler layer play a role as a spring to improve the shock resistance with the characteristic of high elasticity and high density, and when pressure is applied to the tapes, they have fast restoring forces.

It can be expected that the shock resistance of the double-sided tape according to the exemplary embodiments of the present invention is more improved by average 300% or more than the comparative examples. Thus, the embodiments have a compression rate of about 50% for the comparative examples, and have excellent repellent resistance to restrain impacts from being applied to an ITO sensor although the tape is not made thick. Thus, it can be known that even if the product having a thickness of 300 μm to which the comparative examples applies is manufactured to have the thickness of 200-250 μm in the embodiments, it can exhibit the shock resistance equal to or superior to that of the embodiments.

Meanwhile, the difference of the shock resistance of the double-sided tape may cause a remarkable difference even in a waterproof property of the touch screen panel because of the cracks or peeling. That is, even if the double-sided tapes are manufactured to have the same thickness, the double-sided tapes in the comparative examples and the embodiments have remarkably different shock resistance.

In other words, according to the embodiments of the present invention, waterproofing performance of IPx7 or more can be implemented due to such shock resistant difference, while the comparative examples implements much lower waterproofing performance than the embodiments. Herein, IP means IP_Ingress Protection rating, the first number x indicates classifying a grade for a dust proof function into 0-6, and the second number indicates classifying a grade for a waterproof function into 0-9k. A higher number indicates excellent performance.

Further, in the double-sided tapes according to the embodiments of the present invention, since pressure in adhering by the shock resistant filler layer focuses on a binding portion to easily extrude air present in an adhesion interface, excellent adhesion that prevents a gap through which water are penetrated can be implemented, in connecting rigid bodies, thereby improving a waterproof property.

Further, according to the exemplary embodiment of the present invention, a thickness direction of the double-sided tape has more excellent step compensation by the shock resistant filler layer than the comparative example, which can give a great advantage to the waterproof property.

Meanwhile, the conventional double-sided tapes for touch screen panels have a so-called open cell structure that a foaming agent is inserted into a PE resin in manufacture to make openings, and the openings give rise to cushiness. Herein, they have problems such as a big thickness deviation of 20-30 μm, and an ununiform surface.

However, the double-sided tape 100 for the touch screen panel according to the exemplary embodiment of the present invention does not use such a PE-foam, and has a so-called closed cell structure using the shock resistance filler layer. Thus, in accordance with the embodiment, since the thickness of the tape is adjusted by coating unlike the conventional double-sided tape having the open cell structure, the tape can have a uniform thickness on the whole. Also, since the shock resistant filler layer is formed by a coating process, its thickness can be easily adjusted to have excellent productivity and wetting. In the conventional PE-foam, it is difficult to have a distribution value of a uniform thickness.

In addition, the tensile strength of the adhesive layer and the shock resistant filler layer may be about 2 kgf/mn$^2$, and the physical property may be 30 kgf/mm$^2$ or less according to the tensile strength of PET as the base film.

Hereinafter, a method for manufacturing a double-sided tape 100 for a touch screen panel according to an exemplary embodiment of the present invention will be described below.

Figure 4:
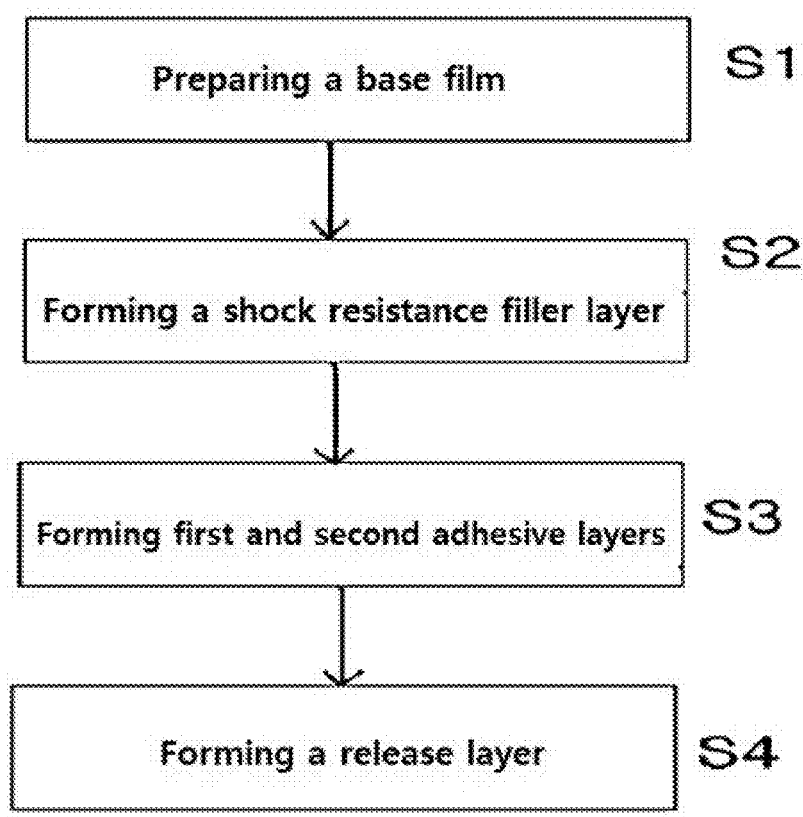
FIG. 4 is a flowchart of a method for manufacturing a double-sided tape for a touch screen panel according to an exemplary embodiment of the present invention.

FIG. 4 is a flowchart of a method for manufacturing a double-sided tape for a touch screen panel according to an exemplary embodiment of the present invention.

With reference to FIG. 4, the base film 10 first turns black (S1). Herein, the black coloring agent may use at least one of carbon black and iron sulfide. Furthermore, it is preferable to properly mix and use the carbon black or the iron sulfide to prevent part of the base film 10 from being lumped to turn. The carbon black or the iron sulfide is preferably sufficiently stirred at 300 rpm or less for 10-30 minutes so as not to affect uniform stirring and a physical property. However, the present invention is not limited thereto.

Next, the shock resistant filler layer 20 is formed by coating a paste containing a shock resistance filler having the acylic binder and a plurality of hollow fine particles 21 on the upper side of the base film 10 (S2). Herein, the shock resistant filler may comprise 5-60 parts by weight with respect to 100 parts by weight of the acrylic binder. Further, it may further comprise an additive containing 0.1-30 parts by weight of a cross linker, as needed. Herein, the shock resistant filler layer 20 may turn black as needed.

Figure 5:
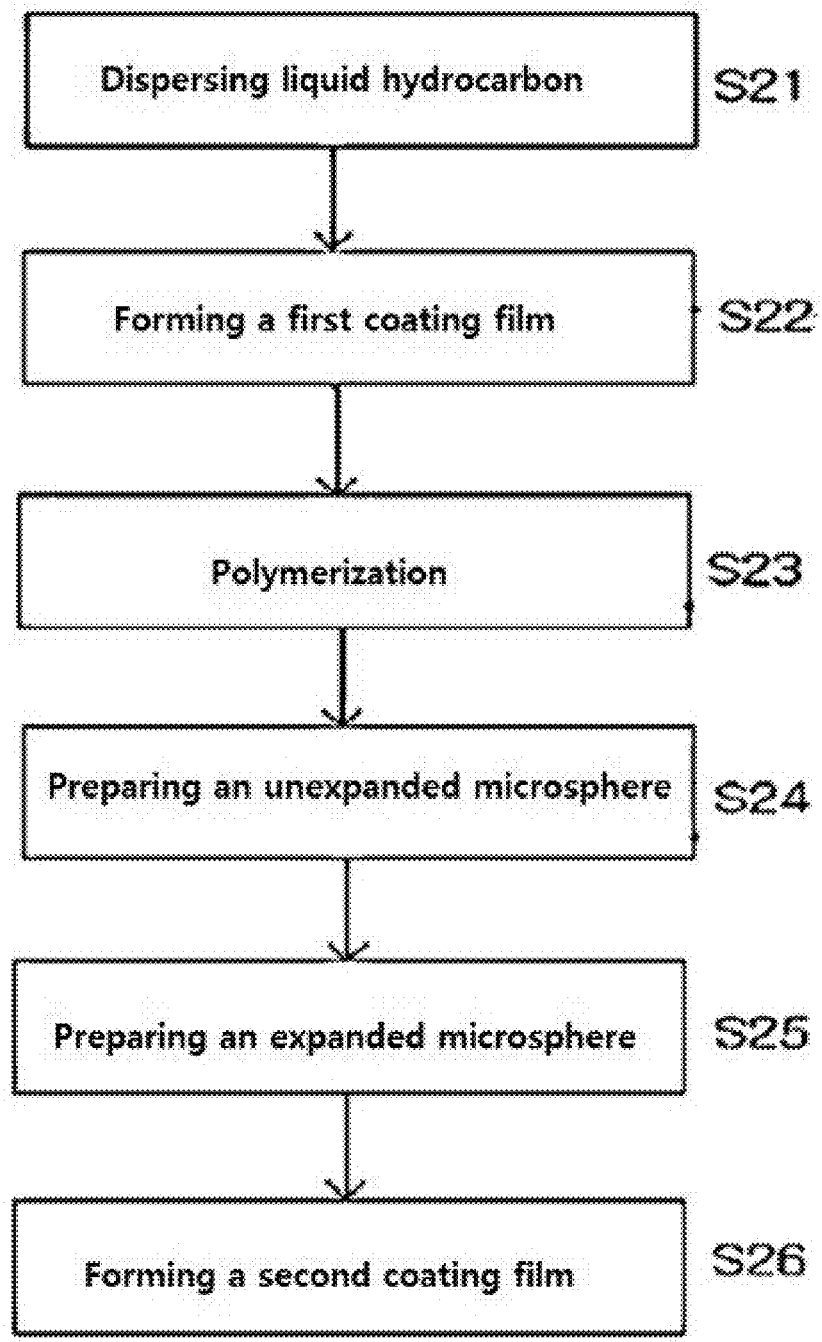
FIG. 5 is a flowchart of a method for manufacturing a shock resistant filler of a shock resistant filler layer in the double-sided tape for the touch screen panel according to an exemplary embodiment of the present invention.

FIG. 5 is a flowchart of a method for manufacturing a shock resistant filler of the shock resistant filler layer in the double-sided tape for the touch screen panel according to an exemplary embodiment of the present invention. With reference to FIG. 5, an exemplary embodiment of a method for manufacturing the hollow fine particle is described as follows.

First, 2-20 parts by weight of liquid hydrocarbon and a dispersing agent are inputted into 0.1-1 parts by weight of water, with respect to a total of 100 parts by weight of the follow fine particle 21.

Herein, the liquid hydrocarbon may comprise, for example, 1-10 parts by weight of 2-methylbutane and 1-10 parts by weight of 2-methylpropane. Further, the dispersing agent may be a moderate amount of a surfactant. Thereafter, the hydrogen dispersion is prepared by dispersing the liquid hydrocarbon not mixed with water, at a certain size, by using the surfactant (S21).

Herein, additives such as a cross linker and the like may be further inputted thereto, as needed. The size limitation of the additives can be adjusted by the gravity. When the size of the filler gets bigger, and porous layers of the hollow fine particles grow bigger, the shock resistant filler layer 20 has a low gravity, and when the filler gets smaller than the standard, the porous layers of the hollow fine particles get smaller, and the gravity thus grows bigger.

Thereafter, a thermoplastic material containing a monomer is inputted into the dispersed liquid hydrocarbon, the dispersed liquid hydrocarbon is referred to as a nucleating agent, and then, a first coating film to surround the liquid hydrocarbon is formed, thereby preparing a particulate crystal (S22).

Herein, the monomer may comprise a copolymer of 15-40 parts by weight of acrylonitrile with respect to a total of 100 parts by weight of the hollow fine particle and other acylic groups.

Thereafter, the particulate crystal having the first coating film formed thereon is polymerized (S23). The polymerization is that for example, 0.1-5.0 parts by weight of a polymerization initiator is added to the liquid hydrocarbon and is heated at a temperature of 140-150° C. for 10-60 minutes, from which the particulate crystal is heated to remove the hydrocarbon, thereby preparing an unexpanded microsphere is prepared (S24). Herein, the polymerization may proceed through a manner of separating the first coating film from the liquid hydrocarbon with a difference of the gravity, as needed.

Thereafter, the unexpanded microsphere is heated, for example, for 10-60 minutes to expand the diameter of the first coating film, and as a result, an expanded microsphere having an expanded volume in comparison with the originally provided unexpanded microsphere is prepared (S25). Herein, the unexpanded microsphere may be heated, for example, for 110-190° C., and more preferably, for 130-170° C. However, the present invention is not limited thereto. When the heating temperature is less than 110° C., microsphere is insufficiently expanded, which may lead to the problem of lowering repellent resistance and chemical stability of the hollow fine particles. Further, when the heating temperature is greater than 190° C., since the repellent resistance is lowered, chemical resistance and storage stability are vulnerable, and it may be difficult to implement the characteristic of the product.

That is, when the liquid hydrocarbon is referred to as the nucleating agent, and the outer wall is surrounded by an acrylic monomer, the particulate crystal is polymerized to remove the liquid hydrocarbon. Then, the first coating film is expanded to form the microsphere which has the porous layer formed thereon, has a hollow part and has an expanded volume, thereby manufacturing the shock resistant filler having the expanded microsphere.

Thereafter, a second coating film containing 50-80 parts by weight of calcium carbonate with respect to a total of 100 parts by weight of the hollow fine particles may be further disposed on the circumference of the first coating film of the expanded microsphere, as needed.

Figure 6:
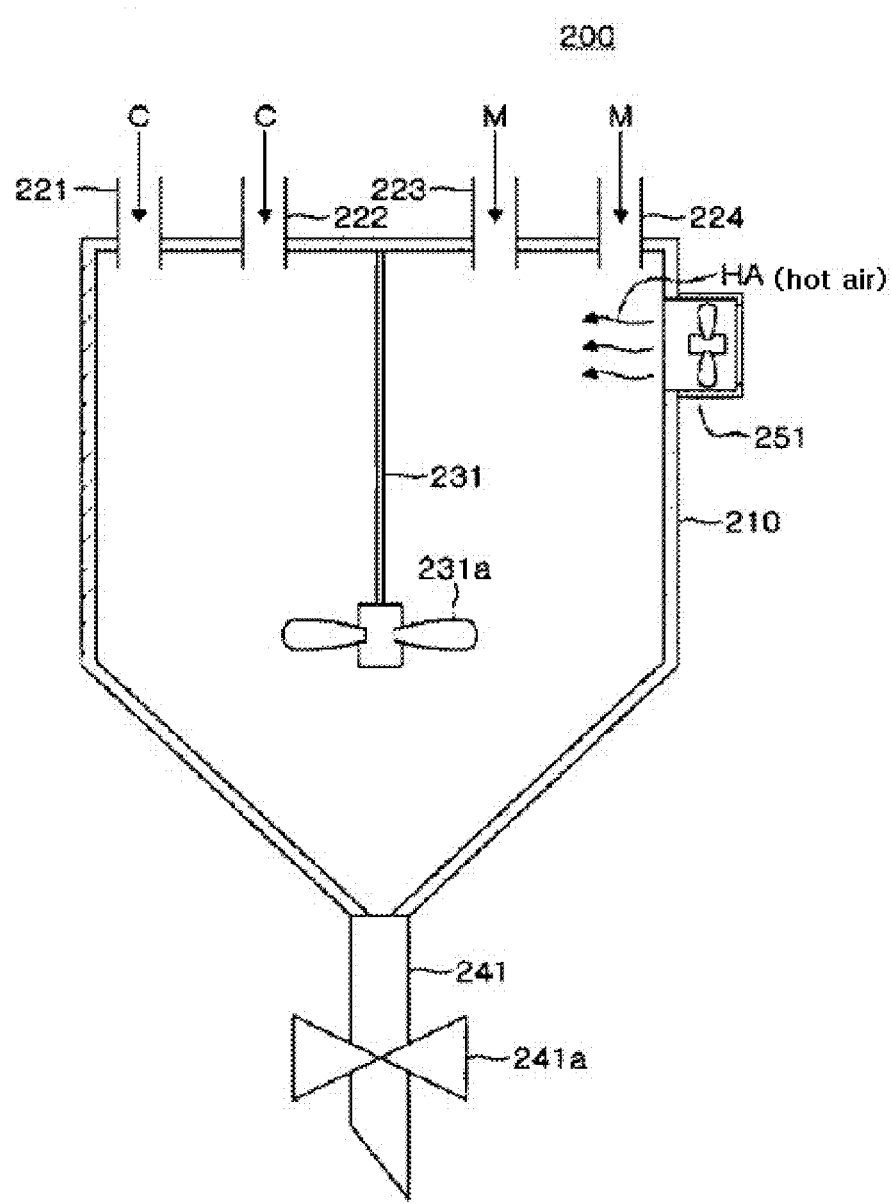
FIG. 6 is a configuration view of schematically showing a reactor for forming a second coating film on an expanded microsphere according to an exemplary embodiment of the present invention.

With reference to FIG. 6, in the second coating film, for example, the expanded microsphere (M) and calcium carbonate (C) are inserted into a main body 210 of a reactor 200 through injection parts 221-224 formed in a pipe shape, and hot air having a temperature of about 130-150° C. is inserted thereto through an air supply part 251, thereby allowing the expanded microsphere (M) and the calcium carbonate (C) to float in the main body 210 of the reactor 200. In this state, the second coating film may be progressed to be formed while the calcium carbonate (C) bumps against the circumference of the first coating film of the expanded microsphere (M) and is embedded therein.

Herein, the velocity of supplying the air inserted into the main body 210 of the reactor 200, and the like, can be controlled to the extent that the expanded microsphere (M) and the calcium carbonate (C) can properly float and flow in the main body 210 of the reactor 200. Further, in the main body 210, a rotating shaft 231 having a propeller 231a may be installed to circulate the inserted air, the expanded microsphere (M) and the calcium carbonate (C) and to more smoothly form the second coating film. Further, the temperature of the air makes the first coating film tender to easily embed the calcium carbonate (C) on the circumference thereof. However, the temperature of the air according to the present invention is not limited thereto. Furthermore, in a lower end of the main body 210, a discharge part 241 having a valve 241a may be prepared to discharge the microsphere (M) having the second coating film formed thereon.

The second coating film serves as restraining condensation and a shattering property of the expanded microsphere (M). Further, the density is measured by comparing the amount of the thermoplastic material inputted in the foregoing step and the amount and weight of a plurality of hollow fine particles finally completed, as needed. Thus, the density of the hollow fine particles can be uniformly maintained. Furthermore, the shock resistant filler in the embodiments is light in a hardening process to floats at the top, all of which escapes in air.

Meanwhile, by randomly extracting samples and measuring their gravities, it can be confirmed whether the shock resistant filler layer 20 has a uniformly sized distribution or not. When the shock resistant filler layer 20 comprises large numbers of big fillers, it is lighter than a suitable standard sample, and when it comprises large numbers of small fillers, it is heavier than the suitable standard sample.

In accordance with the embodiments, as described above, the danger of extinguishing the liquid hydrocarbon in the shock resistant filler layer at a high temperature, and shattering the particles of the porous layer may occur. However, the second coating film gives a fixed weight to the expanded microsphere (M) to improve the dispersibility of the first coating film of the expanded microsphere (M). As a result, the second coating film serve as preventing the hollow fine particles 21 from be shattered, and can provide an effect of improving the shock resistance of the hollow fine particles 21.

Further, the second coating can serve as increasing gravities of the hollow fine particles 21 while preventing the hollow fine particles 21 from being condensed in the shock resistant filler, and can serve as improving a mixing property.

Herein, the second coating film may comprise 50-80 parts by weight of calcium carbonate with respect to 100 parts by weight of the hollow fine particles 21. Herein, when the content of the calcium carbonate is less than 50 parts by weight, workability may be decreased because of shattering the shock resistant filler, and when the content of the calcium carbonate is greater than 80 parts by weight, the shock resistance may be lowered.

Next, the first and second adhesive layers 30, 40 are formed on the upper side of the shock resistant filler layer 20 and the lower side of the base film 10, respectively (S3).

Next, the release layer 50 is formed on the lower side of the second adhesive layer 40 to complete the double-sided tape for the touch screen panel (S4).

The present invention should not be construed as limited to the embodiments set forth herein and the accompanying drawings, and is only defined by scopes of claims.

Thus, it will be apparent to those skilled in the art that replacements, modifications, and variations can be made without departing from the spirit and scope of the invention.

10; a base film
20; a shock resistant filler layer
21; hollow fine particles
30, 40; first and second adhesive layers
50; a release layer
100; a tape
200; a reactor

What is claimed is:

1. A method for manufacturing a double-sided tape for a touch screen panel, comprising:
    preparing a base film and coloring the base film black;
    disposing a shock resistant filler layer on an upper side of the base film by coating a paste including an acrylic binder and a shock resistant filler having a plurality of hollow fine particles;
    disposing first and second adhesive layers on an upper side of the shock resistant filler layer and a lower side of the base film, respectively; and
    disposing a release layer on a lower side of the second adhesive layer,
    wherein the plurality of hollow fine particles are manufactured by the steps of:
        preparing a hydrocarbon dispersion by adding 2-20 parts by weight of liquid hydrocarbon with respect to a total of 100 parts by weight of the hollow fine particles and a dispersing agent having a surfactant into water;
        preparing a particulate crystal by adding 15-40 parts by weight of a thermoplastic material into the hydrocarbon dispersion, with respect to the total of 100 parts by weight of the hollow fine particles, and forming a first coating film by the thermoplastic material surrounding the dispersed liquid hydrocarbon;
        forming an unexpanded microsphere by heating the particulate crystal and removing the dispersed liquid hydrocarbon; and
        forming an expanded microsphere constituting each of the plurality of hollow fine particles by heating the unexpanded microsphere and expanding the first coating film.

2. The method of claim 1, wherein the plurality of hollow fine particles are manufactured by further the step of arranging a second coating film containing 50-80 parts by weight of calcium carbonate with respect to the total of 100 parts by weight of the hollow fine particles, on a circumference of the first coating film of the expanded microsphere.

3. The method for of claim 2, wherein the step of forming the second coating film comprises the steps of:
    inputting the expanded microsphere and the calcium carbonate into a reactor, and inserting air thereto at a temperature of 130-150° C., thereby floating the expanded microsphere and the calcium carbonate inside the reactor; and
    forming the second coating film by embedding the calcium carbonate on an outer wall of the first coating film of the expanded microsphere.

4. The method of claim 1, wherein, in the step of preparing the hydrocarbon dispersion, the liquid hydrocarbon comprises 1-10 parts by weight of 2-methylbutane and 1-10 parts by weight of 2-methylpropane, with respect to the total of 100 parts by weight of the hollow fine particles.

5. The method for of claim 1, wherein the thermoplastic material is a copolymer of acrylonitrile and one or more of phosphate methacrylate and alkali strippable polyester acrylate, in the step of preparing the particulate crystal.

6. The method of claim 1, wherein the unexpanded microsphere is heated at a temperature of 70-190° C., in the step of forming the expanded microsphere.

7. The method of claim 1, wherein at least one of carbon black and iron sulfide is used as a black coloring agent, in the step of coloring the base film black.

8. The method of claim 1, wherein the shock resistant filler contains 5-60 parts by weight with respect to 100 parts by weight of the acrylic binder, in the step of disposing the shock resistant filler layer.

* * * * *